United States Patent [19]

Albrecht-Buehler

[11] 3,971,621
[45] July 27, 1976

[54] METHOD AND APPARATUS FOR GENERATING A RELIEF-LIKE CONTRAST AT MICROSCOPIC IMAGES OF A TRANSPARENT PHASE OBJECT

[75] Inventor: Gunter Albrecht-Buehler, Gainerville, Fla.

[73] Assignee: Ciba-Geigy Corporation, Ardsley, N.Y.

[22] Filed: Feb. 27, 1974

[21] Appl. No.: 446,449

[30] Foreign Application Priority Data

Mar. 1, 1973 Switzerland.......................... 3001/73

[52] U.S. Cl. .............................. 350/87; 350/96 B; 240/2 MA
[51] Int. Cl.² .......................................... G02B 21/06
[58] Field of Search ............................. 350/87–89, 350/91, 96 B; 240/2 MA

[56] References Cited
UNITED STATES PATENTS

| 2,144,653 | 1/1939 | Graff................................. 350/91 X |
| 2,480,312 | 8/1949 | Wolf.................................. 350/90 X |
| 3,186,296 | 6/1965 | Erban................................. 350/91 |
| 3,278,739 | 10/1966 | Royka et al..................... 350/96 B X |
| 3,361,031 | 1/1968 | Stroud............................... 350/87 X |
| 3,490,828 | 1/1970 | Rehm................................. 350/87 |
| 3,600,568 | 8/1971 | Weyrauch........................ 350/87 X |
| 3,710,091 | 1/1973 | Holcomb........................ 350/96 B X |

FOREIGN PATENTS OR APPLICATIONS

| 551,673 | 1/1923 | France................................. 350/87 |
| 396,325 | 8/1933 | United Kingdom................. 350/91 |

*Primary Examiner*—David H. Rubin
*Attorney, Agent, or Firm*—Harry Falber; Karl F. Jorda

[57] ABSTRACT

A method of, and apparatus for, generating a relief-like contrast at microscopic images or micrographs of a transparent phase object, wherein the object is obliquely illuminated at one side with respect to the plane of the object and observed during transillumination. For illuminating the object there are employed mutually incoherent beams of light rays possessing axes which are essentially parallel to one another.

The microscope for the performance of the aforesaid method aspects embodies an object illumination device encompassing a light source and a light conductor formed of a bundle of glass fibers, the light radiating end of which is arranged at the direct neighborhood of the point of intersection of the optical axis of the objective of the microscope with the object slide or support and encloses with such axis an angle which is preferably in the range of about 40° to 50°.

6 Claims, 2 Drawing Figures

METHOD AND APPARATUS FOR GENERATING A RELIEF-LIKE CONTRAST AT MICROSCOPIC IMAGES OF A TRANSPARENT PHASE OBJECT

BACKGROUND OF THE INVENTION

The present invention relates to a new and improved method of, and apparatus for, producing a relief-like contrast at a microscope image or micrograph of a transparent phase object.

During the observation of a transparent, non-contrasting phase object, especially living tissues or cells, it is already known to the art for generating a relief-like contrast at the microscope image of such object to illuminate the object obliquely with regard to the object plane at one side from the underside of the object slide or support. In the context of this disclosure there is to be understood under the term "phase object" a microscope object wherein the optical distance is locally inhomogeneous.

However, with this relatively simple technique there can only be realized a relatively low resolution. The reason for the poor resolution is predicated upon the diffraction effects which cannot be avoided when employing conventional illumination techniques and which practically render impossible the observation of smaller structures.

The development of the interference microscope constituted a measure which attempted to overcome this situation. As is known the most commonly used interference microscopes, for instance those working according to the principles of Jamin-Lebedeff and those according to Nomarski, work with linear polarized light which is split at a so-called Wollaston-prism into two light beams which are polarized at right angles to one another and spatially parallelly offset. After both of the beams of light rays have passed through the phase object and the objective they are again consolidated at a second Wollaston-prism and with the aid of an analyzer brought to interference. The thus prevailing intermediate image is then observed in conventional manner by means of an ocular. The interference image possesses a characteristic plastic effect which is similar to the one-sided oblique illumination of the bright ground or field.

Unfortunately it has however been found that although the principle of operation of an interference microscope is indeed relatively simple, still the practical construction of such microscope is associated with considerable difficulties. The fact that it is particularly necessary to work with polarized light especially contributes to these difficulties. As is well known it is almost virtually impossible to mount the optical lenses at the microscope free of stress, with the result that undesired double refraction effects arise which again must be avoided in a quite cumbersome manner. Moreover, it is extremely difficult to fabricate a Wollaston-prism from which emanate with the same intensity the ordinary and extraordinary light beams. Hence, technical difficulties arise during the construction of an interference microscope which, although capable of being overcome with the technology available at the present time, still nonetheless considerably increase the price of such microscope.

The microscopes used for scientific purposes generally possess an illumination device which transmits the light from a light source via a condensor onto the object which is to be observed. During the course of the development of microscopes it has been found that the condensor is responsible for a great many image errors. Therefore, attempts have of course been made to continually improve upon the condensors and it has actually been possible to overcome numerous disturbing effects. Yet, no condensor which has been developed up to the present time can avoid diffraction effects of object structures from becoming visible at the image plane and which are not focused at the image plane. These diffraction patterns are superimposed upon the image of the phase object and render interpretation of the image more difficult.

SUMMARY OF THE INVENTION

Hence, it is a primary object of the present invention to provide an improved method of, and apparatus for, producing a relief-like contrast at a microscope image of a transparent phase object in a manner which is not associated with the aforementioned drawbacks and limitations of the prior art proposals.

The method aspects of this development contemplate illuminating the object obliquely with regard to the object plane at one side of the object and observing such in the transmitted light. According to the invention, in order to illuminate the object there is employed mutually incoherent beams or bundles of light rays having axes which are essentially parallel to one another.

The invention is based upon the recognition that the influence of the disturbing diffraction effects at the microscope image are markedly suppressed with increasing incoherence of the light illuminating the object.

According to a preferred exemplary embodiment of the method aspects of this development the axes of the beams of light rays can enclose with the axis of the objective an angle between 40° and 50°. The aperture angle, at which each beam of light rays diverges, preferably should not be greater than 65°. The number of beams or pencil of rays per square millimeter can be approximately in the order of between 100 and 1000. All of the beams can depart from a plane, the surface area of which advantageously is in the order of between 0.8 mm² and 80 mm². In order to produce the incoherent light beam there is advantageously employed a light conductor consisting of a bundle of glass fibers, in other words fiber optics.

Not only is the invention concerned with the aforementioned method aspects but also relates to a new and improved construction of microscope for the performance of the novel method of this development. This microscope is manifested by the features that there is provided an object illumination device incorporating a light source and a light conductor formed of a bunch or bundle of glass fibers, the light radiating or emitting end of which is arranged at the direct neighborhood of the point of intersection of the optical axis of the objective with the object slide or support and enclosing with such axis an angle of preferably about 40° to 50°. In order to intensify the effect which is realized by virtue of the practice of the invention it can be advantageous to fray or splice the bundle of glass fibers at its end confronting the light source. It is advantageous if the angle between the axis of the objective and the direction of the light radiating end of the light conductor is adjustable. Furthermore, it can be advantageous if the light radiating end of the light conductor is adjustable parallel to the plane of the object and its spacing adjustable to such object plane. Also it can be advantageous if the light source, the light conductor and the adjustment means are assembled together into a structural unit which is detachably connected with the optical components or parts of the microscope.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
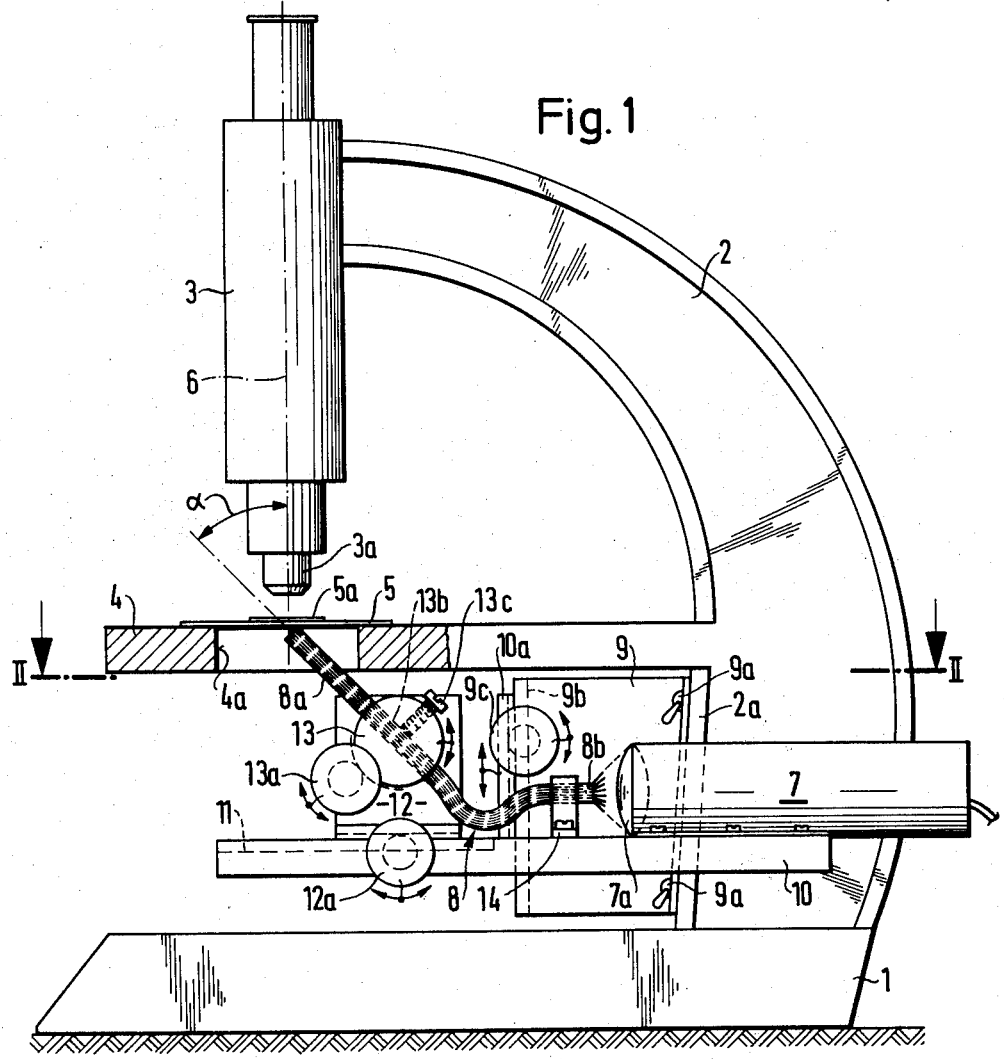
FIG. 1 is a side view of a microscope designed according to the teachings of the present invention.
Figure 2:
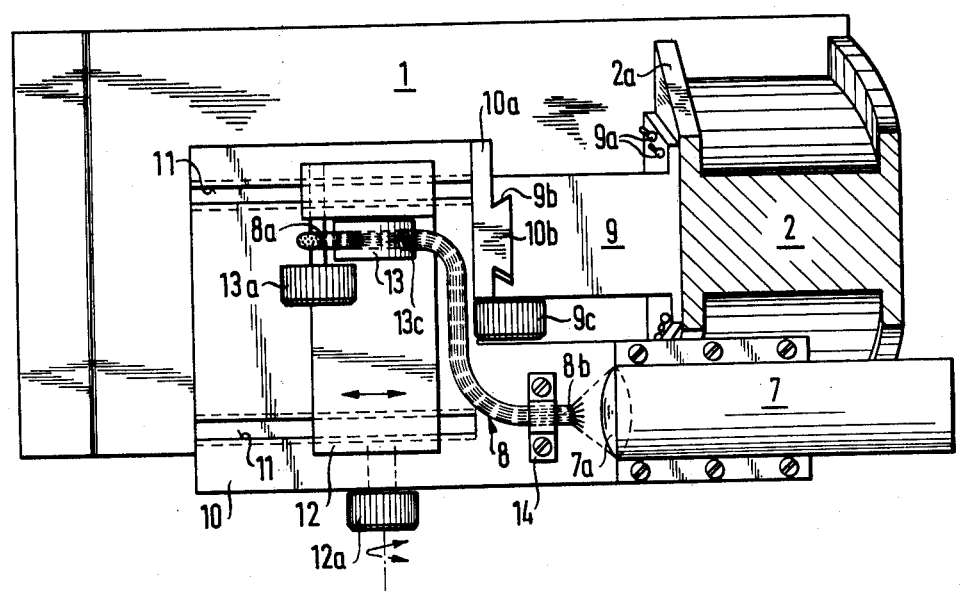
FIG. 2 is a cross-sectional view of the microscope depicted in FIG. 1, taken substantially along the line II—II thereof.

Referring now to the drawings it is to be understood that the exemplary embodiment of microscope designed according to the teachings of the present invention has only been shown as far as the more significant components thereof are concerned in order to simplify the illustration. Turning therefore specifically to the showing of FIG. 1 it is to be understood that reference character 1 designates a baseplate at which there is attached in any convenient manner a stand 2. At the upper end of the stand 2 there is conventionally arranged the tube 3 of the microscope. An object stage or platform 4 likewise connected with the stand 2 extends substantially horizontally, and its surface which is intended for supporting the phase object is located slightly beneath the objective 3a of the microscope. The object stage 4 is provided with a continuous opening or recess 4a at the region beneath the microscope tube 3, and by means of which recess or opening there can be illuminated the object which is to be observed. The object or specimen is mounted at an object slide or support 5 and is protected in standard fashion by means of a cover glass or cover slip 5a. The object slide or support 5 is arranged at the object stage 4 in such a manner that the object to be observed is located within a narrow region about the point of intersection or penetration point of the optical axis 6 of the microscope i.e. the objective with the plane of the object.

An illumination device is arranged between the baseplate 1 of the microscope and the object stage 4. This illumination device essentially comprises a lamp 7, a light conductor 8 and means for adjusting the position of the light conductor 8 with regard to the object stage 4, i.e. the object.

A coupling component 9 is flanged by means of four locking levers 9a or equivalent structure with the front transverse web or strap 2a of the stand 2 and which web extends between the object stage 4 and the baseplate 1. This coupling component or portion 9 is provided at its side facing away from the stand 2 with a vertically extending dovetail guide 9b in which there is displaceably mounted a corresponding shaped profile member 10b. The profile member 10b constitutes part of a vertical leg 10a of an otherwise horizontally extending plate member or bedplate 10 at which there are mounted the remaining components of the illumination device. At the coupling portion 9 there are furthermore arranged means which, in a manner well known in the optic and high precision instrument art, enable vertically adjusting the leg 10a and thus the entire bedplate or plate member 10 by means of the knurled knob or wheel 9c or equivalent structure.

The plate member 10 is equipped with two parallel guide grooves 11, which in cross section possess a dovetail configuration, the guide grooves 11 being provided for guiding a carriage 12 which is mounted so as to be horizontally displaceable by means of two not particularly illustrated profile rail members at the grooves 11. In order to displace the carriage 12 there is provided a knurled knob or wheel 12a which cooperates with a standard feed mechanism as is used in high precision instruments and which has been conveniently omitted from the drawings in order to preserve clarity in illustration, particularly since the details thereof do not constitute subject matter of the invention.

At the carriage 12 there is mounted for rotation about a horizontal axis a cylindrical disk 13 which can be rotated through the action of a further knurled knob or wheel 13a or the like and can be fixed in each angular position which it is capable of assuming. The disk 13 is equipped with a continuous diametric bore 13b and serves as the support or holder for the end 8a of a light conductor 8 and which light conductor end 8a is located at the side of the object. This light conductor 8 consists of a bunch or bundle of glass fibers, i.e. fiber optics, all of which possess an optically thicker core and an optically thinner jacket or shell, so that light which has once entered the glass fibers through the ends of these fibers is further conveyed internally thereof according to the well known principle of total reflection.

The end 8a of the bundle of glass fibers is piercingly guided through the bore 13b of the disk 13 and extends with a portion of the edge of its end surface up to the location of the object slide or support 5 at which there is disposed the object or specimen which is to be observed. For purposes of fixing the glass fiber bundle in the bore 13b there is conveniently provided a clamping screw 13c or equivalent structure.

Now at the side of the bedplate or plate member 10 which is opposite the carriage 12 there is secured a lamp 7 equipped with a condensor lens 7a. The end 8b of the bundle of glass fibers 8, and which end is located at the side of the lamp 7, is positioned by means of a holder 14 in front of the condensor lens 7a in such a manner that the light emanating from the lamp 7 is more or less focused upon the ends of the fibers of the fiber optics.

As far as the bundle of glass fibers 8 is concerned such can be, for instance, a bundle of glass fibers having a surface area of its cross-section in the order of about 0.80 $mm^2$ to 80 $mm^2$, corresponding to a fiber diameter of 50 $\mu$m, i.e. with a fiber density of 375 fibers per square millimeter amounting to about 300 to 30,000 individual fibers provided for the light conductor. The aperture angle, at which the light emanating from each glass fiber diverges, for such fibers amounts to about 60° to 65°. Generally, the number of individual fibers per square millimeter should be in the order of between 100 and 1000.

Furthermore, it is to be observed that the end of the glass fiber bundle which is at the side of the lamp is not smoothly cut-off, rather completely irregularly broken-off and frayed or spliced. Owing to the unequal lengths and diverging fiber ends there can be realized a particularly high incoherence of the light which is guided through the fibers of the light conductor.

In order to realize an optimum relief effect the angle α, which the object-side end 8a of the glass fiber bundle encloses with the optical axis 6 of the microscope, depending upon the mean or average index of refraction of the object, is adjusted to about 40° to 50° and thus finally adjusted by means of the knurled knobs or wheels 13a, 12a and 9c with respect to optimum image illumination, contrast effect and image plasticity.

The light emanating from the lamp 7 is focused through the agency of the condensor lens 7a at the end 8b of the glass fiber bundle, which end is completely irregularly broken-off and additionally frayed and at that location enters the individual glass fibers. Each fiber so-to-speak "takes" its part of the light however from a completely random spatial angle, so that the light beams which are conducted further through the individual fibers and the bundle of light beams which emanate at the side of the object from the ends of the fibers no longer possess any mutually fixed phase relationship. The bundle of light rays which parallelly depart out of the glass fibers are thus incoherent with regard to one another.

If the object is illuminated at an angle of incidence of about 45° with such incoherent bundle of light rays, then, the diffraction effects which are so disturbing during the conventional illumination techniques disappear and there is obtained a microscope image of the phase object which is to be observed, which image is of high contrast, sharp and possesses a plastic effect.

It has been found that images possessing a relief-like impression can be produced with the method aspects of this development, and which images are not only equal to images produced by means of an interference contrast microscope, but considerably surpass such as concerns quality.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. In the method of producing a relief-like contrast at the microscope image of a transparent phase object, wherein the object is obliquely illuminated with regard to the object plane at one side of the object and observed at the transmitted light, the improvement comprising the steps of employing a bundle of light rays for the illumination of the object and which bundle of light rays are mutually incoherent with respect to one another and possess axes which extend essentially parallel to one another, the bundle of light rays being produced by means of a light conductor consisting of a bundle of glass fibers having a frayed end portion and an opposing light radiating end, the axes of the bundle of light rays enclosing with the axis of an objective of the microscope an angle in the order of between about 40° and 50°, all of the bundle of light rays emanating from a plane wherein the surface area of such plane is in the order of between about 0.80 mm$^2$ and 80 mm$^2$, and the number of bundle of light rays per square millimeter is in the order of between about 100 and 1000.

2. A microscope for producing a relief-like contrast at a microscope image of a transparent phase object, comprising a microscope objective possessing an optical axis, an object support, an object illumination device generating a mutually incoherent bundle of light rays for oblique illumination of the object, said object illumination device comprising a light source and a light conductor comprising a bundle of glass fibers, said bundle of glass fibers having a frayed end confronting said light source and a light radiating end arranged at the direct region of the point of intersection of the optical axis of the objective with the object support and enclosing with said axis an angle in the order of about 40° to 50°.

3. The microscope as defined in claim 2, further including means for adjusting the angle between the axis of the objective and the direction of the light radiating end of the light conductor.

4. The microscope as defined in claim 3, wherein said adjusting means includes means for adjusting the spacing between the light radiating end of the light conductor and a plane of the object.

5. The microscope as defined in claim 4, wherein said adjusting means further includes means for adjusting the light radiating end of the light conductor essentially parallel to the plane of the object.

6. The microscope as defined in claim 2, further including means for adjusting the relative position of the light radiating end of the light conductor with regard to a plane of the object, said adjusting means together with the light source and the light conductor forming a unit which is detachably secured with the microscope.

* * * * *